Feb. 13, 1951 W. E. URSCHEL ET AL 2,541,180
SECTIONALIZING CUTTING MACHINE
Filed Sept. 11, 1947 5 Sheets-Sheet 1

INVENTORS.
William E. Urschel
Joe R. Urschel
Gerald W. Urschel
BY
Atty

INVENTORS.
William E. Urschel
Joe R. Urschel
Gerald W. Urschel

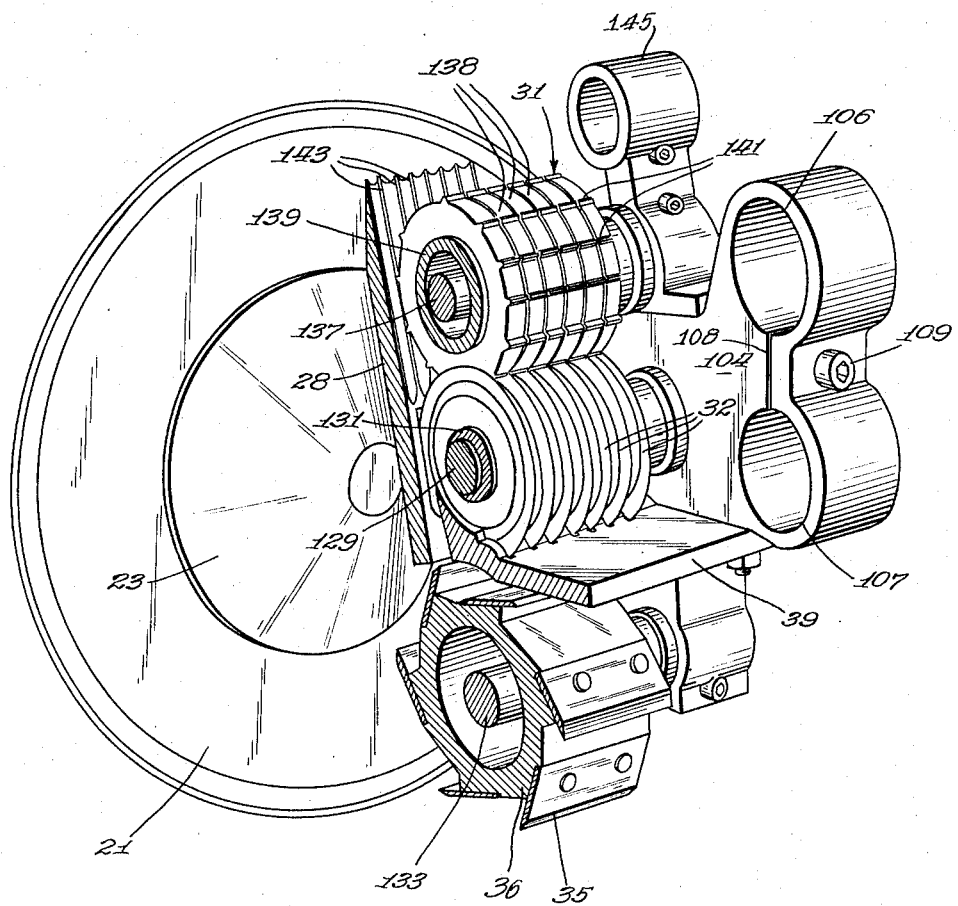

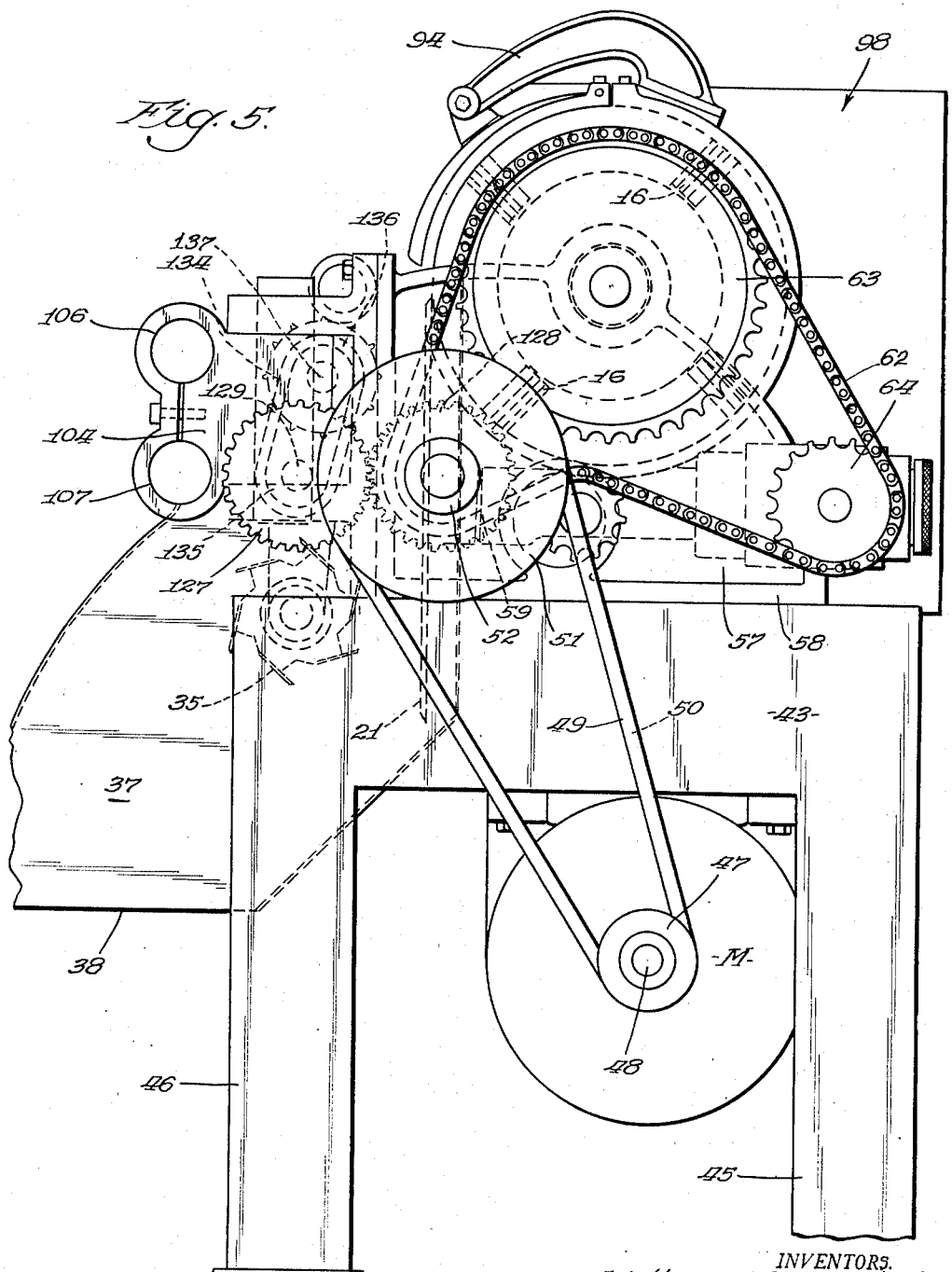

Patented Feb. 13, 1951

2,541,180

UNITED STATES PATENT OFFICE 2,541,180

SECTIONALIZING CUTTING MACHINE

William E. Urschel, Joe R. Urschel, and Gerald W. Urschel, Valparaiso, Ind.; said Joe R. Urschel administrator of said William E. Urschel, deceased Application September 11, 1947, Serial No. 773,356

2 Claims. (Cl. 146—78)

1

This invention has to do with apparatus for sectionalizing cuttable material by slicing and cutting operations into discreet particles of predetermined shape. The invention, in some respects, is an improvement upon the apparatus disclosed in our copending application Serial No. 573,242, filed January 17, 1945, which became Patent No. 2,465,670 on March 29, 1949, for Sectionalizing Cutting Machine, particularly in the elimination of a conveyor belt for transporting sliced material from a slicing mechanism to strip-cutting and dicing instrumentalities and the substitution for such belt of a strip-cutting block of which an extending portion slidably receives sliced material directly from the slicing mechanism. A compressing and feeding roller is cooperable with the extending portion of the strip-cutting block instead of with a conveyor belt as in the machine of said copending application.

An important object of the invention is the provision of an improved machine capable of dicing cuttable material such as potatoes, carrots and other fruit and vegetable articles having body thickness, and wherein sections of the machine for performing successive cutting operations upon the material are closely associated into an integrated unit.

A further object is the provision in a sectionalizing cutting machine of a slicing apparatus which forms slices of cuttable material and discharges the same downwardly, together with a cutting block having a guiding surface extending downwardly from the zone at which the sliced material issues from the slicing apparatus and so disposed that the downwardly projected slices slide downwardly along such surface, there being rotatable knives cooperable with the cutting block for cutting the downwardly traveling slices into strips, and a compressing and feeding roller structure disposed between said knives and the slicing apparatus for compressing the sliced material against said guide face and rotatable for feeding the sliced material between the knives and the cutting block. This downward extending arrangement of the cutting block guide face takes advantage of gravitational force for augmenting that of the compressing and feeding roller structure in causing continued motion of the sliced material in the downward direction initiated by the slicing apparatus. Any tendency for the material sliding over the guide face of the cutting block to adhere thereto and to clog the machine is thus virtually eliminated.

A further object is the provision of parallel downwardly extending ribs upon the guide face of the cutting block, which further diminish any tendency for the sliding material to adhere to such surface, thereby adapting the machine to slice, cut into strips and cube meat as well as fruit or vegetable articles having body thickness.

Still another object is the provision of a carriage mounting for the strip-cutting and dicing sections of the machine whereby such sections may be conveniently separated from the slicing section thereof to facilitate servicing and cleaning of the machine elements.

The above and other desirable objects inherent in and encompassed by the invention will be better understood from the ensuing specification and the annexed drawings wherein a preferred form of the invention is shown.

In the drawings:

Fig. 4 is a fragmentary perspective view showing details of the cutting block, the compressing roller structure and a bank of circular knives cooperable with such block, the dicing instrumentality and support means for these parts.

Fig. 5 is an elevational view of the machine taken on the plane indicated by the line 5—5 in Fig. 2.

Figure 1:
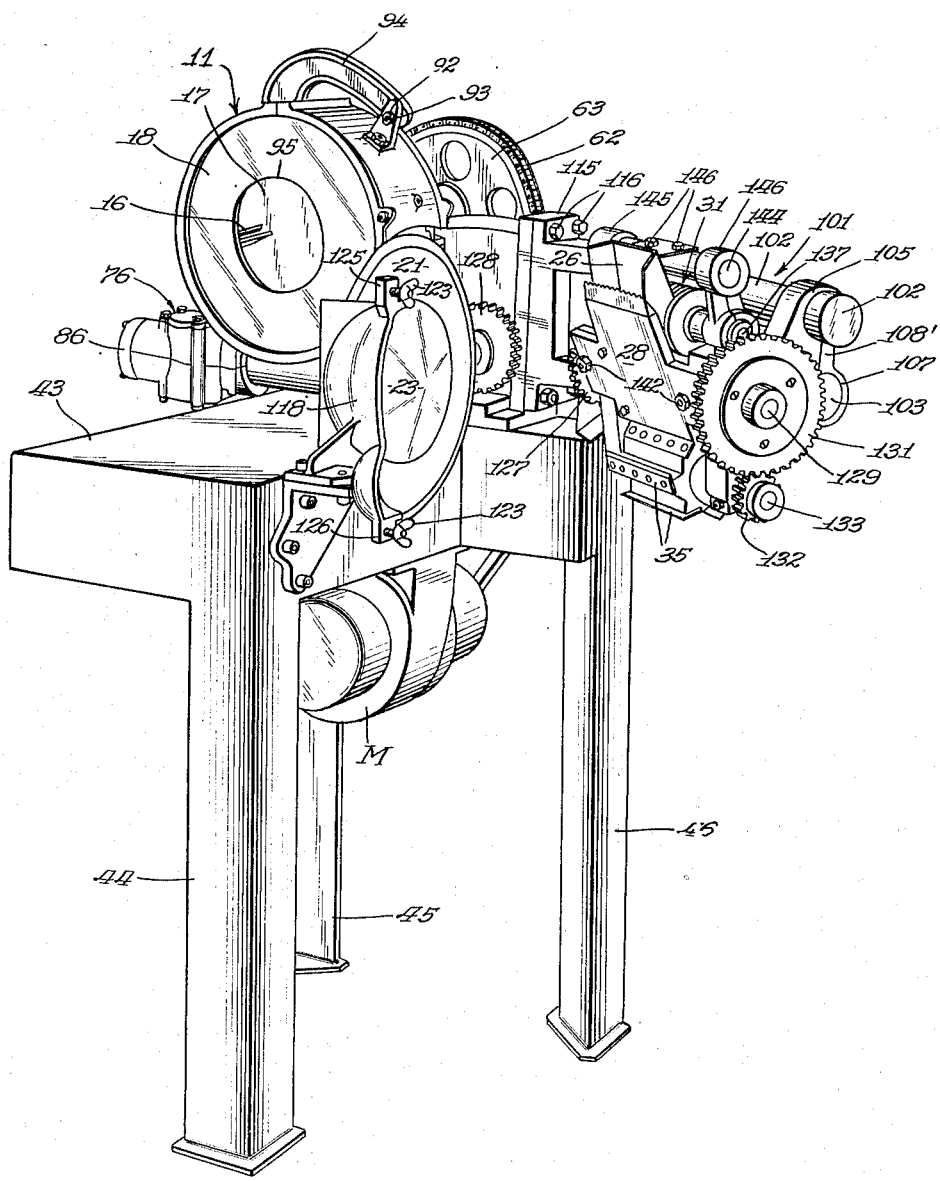
Fig. 1 is a perspective elevational view of an illustrative embodiment of the invention, the machine being illustrated with its carriage for strip-cutting and dicing instrumentalities swung out of cooperative relation with the slicing apparatus to expose certain of the machine elements.
Figure 2:
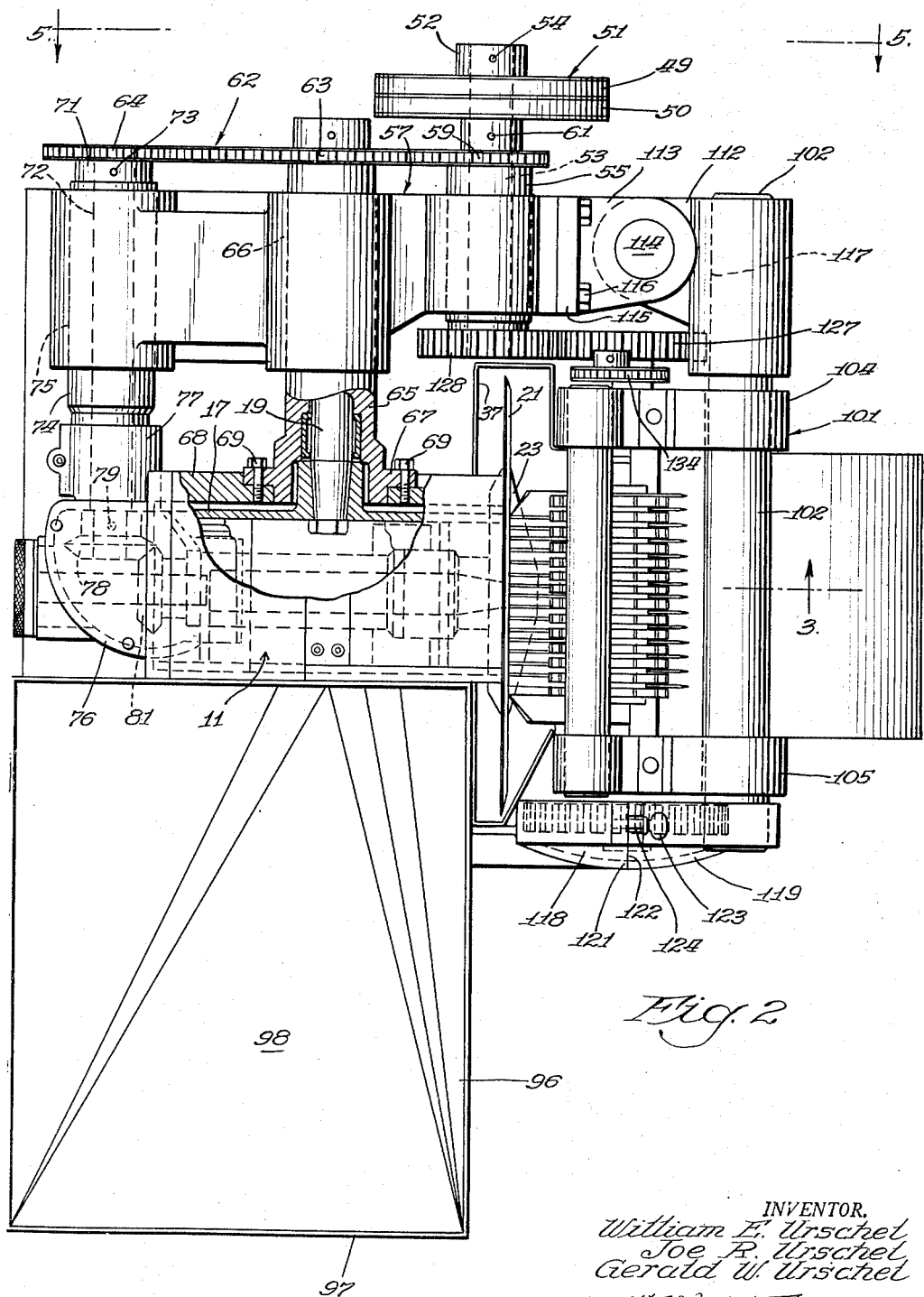
Fig. 2 is a plan view of the machine with the carriage swung into position for placing the strip-cutting instrumentalities into cooperation with the slicing section of the machine. This view also shows a hopper which is omitted from the view in Fig. 1 to expose a rotor chamber which receives slidable articles from such hopper.
Figure 3:
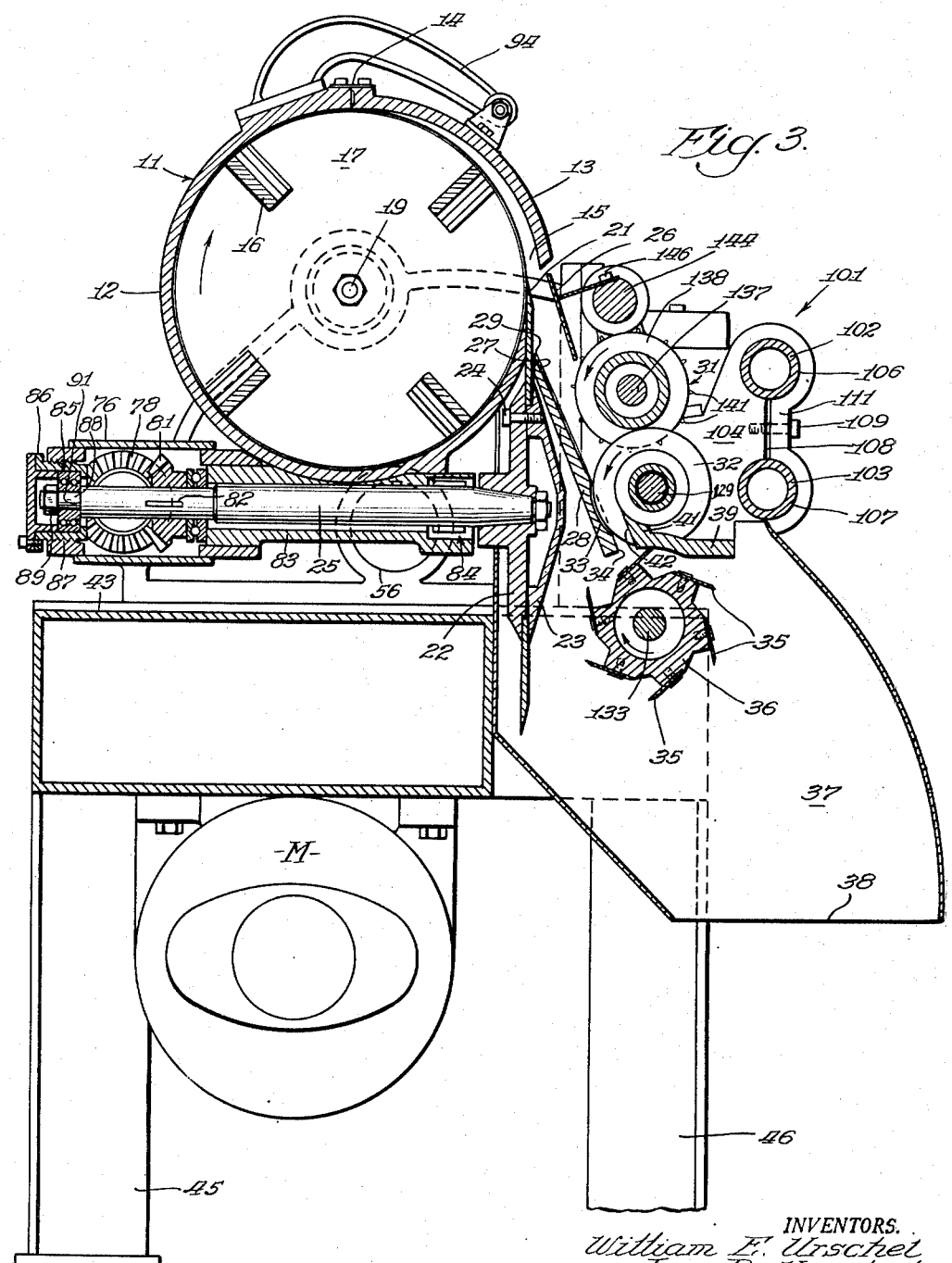
Fig. 3 is a vertical sectional view taken through the machine substantially on the plane indicated by the line 3 in Fig. 2.

The mode of operation of the machine can be generally understood from a brief initial reference to Figs. 1, 2 and 3. Cuttable material or articles are introduced into a rotor chamber 11 having a cylindrical wall 12 having a hinged portion 13 swung slightly radially outwardly at a hinged connection 14 to form a discharge opening 15. Said material is rotated about the inner periphery of the cylindrical wall 12 in the direction indicated by the arrow in Fig. 3 by means of paddles 16 extending between end plates 17 and 18 of a rotor. A shaft 19 extending through an end wall of the chamber 11 supports the rotor by means of its end plate 17, the shaft 19 being the drive shaft of the rotor which is constrained for rotation therewith.

An upper edge portion of a disk knife 21 projects upwardly slightly beyond and adjacently to the lower edge of the opening 15. This knife is clamped to a drive head 22 by means of a circular clamp plate 23 and cap screws 24 of which one is shown in Fig. 3.

A shaft 25 with which the drive head 22 is constrained for rotation causes rotation of the disk knife 21. Those portions of the cuttable material swept circumferentially about the chamber wall 12 and projecting radially of the chamber beyond the upper edge portion of the slicing knife 21 in contact with the eccentrically disposed wall portion 13 will be sliced from the main body of the material and discharged downwardly through the opening 15 tangentially to the chamber wall. A deflector plate 26 assures that the sliced material flatwise engages a guide face 27 of a cutting block or plate 28 pursuant to passing downwardly beyond a receiving edge 29 thereof.

Downwardly precipitated sliced material is thus fed between the guide face 27 of the cutting block and a compressing roller structure 31 which is caused to rotate in the direction of the arrow thereon in Fig. 3. This rotating compressing roller structure thus cooperates with the cutting block face in advancing the material downwardly into the bight between a bank of disk slicing knives 32 and a section of the cutting block face having respective knife-receiving grooves 33 for edge portions of respective of the knives. The knives 32 are caused to rotate in the direction of the arrow thereon in Fig. 3 and thus cooperate with the cutting block in cutting the sliced material into strips and discharging these strips downwardly past a discharge edge 34 of the cutting block face into the path of dicing knives 35 revolved by a dicing knife rotor 36 in the direction of the arrow on such rotor in Fig. 3. These knives 35 progressively cut end portions from the strips as they are projected endwise downwardly from the strip cutting knives 32 and these end portions which are thus severed from the strips in the shape of cubes are discharged downwardly through a chute 37 and outwardly through a bottom end opening 38 thereof into a receptacle or onto a conveyor (neither of which is shown) as desired. A stripper plate or bar 39 has fingers 41 meshed with the bank of knives 32 for presenting a deflecting surface 42 in opposed spaced relation with respect to the face 27 of the cutting block for positively stripping the strips of material from between the strip-cutting knives and insuring endwise discharge of the strips into the path of the revolved dicing knives 35.

Proceeding now to the details of the machine, a table-like frame for the support thereof comprises a top 43 with three upright supporting legs 44, 45 and 46. A driving motor M for the movable parts of the machine is suitably suspended from the underside of the table top 43.

In Fig. 5 there can be seen a double grooved pulley 47 which is constrained for rotation with the motor armature shaft 48. Power is transmitted from the pulley 47 through belts 49 and 50 to a larger double grooved pulley 51; see Figs. 5 and 2. A hub 52 of the pulley 51 is drive-connected to a shaft 53 by a pin 54. This shaft is journaled in a bushing 55 which is anchored in a receiving bore 56 therefor in a multi-bored bracket 57 having a bottom portion 58 with a flat face resting upon and secured to the upper flat face of the table top 43.

Also constrained for rotation with the shaft 53 is a sprocket 59 which has its hub rotatively secured to said shaft by a pin 61. Sprocket 59 drives a chain 62 which is also trained over pulleys 63 and 64. Pulley 63 is drive-connected with an end portion of the rotor shaft 19 which is journaled in a bushing 65 anchored within one of the bores, 66, of the bracket 57. This journal member 65 is constrained against rotation and has an end flange 67, visible in Fig. 2, which has an end wall 68 of the cuttable material receiving chamber 11 secured thereto by cap screws 69.

The sprocket 64 which is driven by the chain 62 has a hub 71 rotatively fixed to a shaft 72 by a pin 73, and this shaft 72 is journaled within a bushing 74 anchored within a bore 75 of the multi-bored bracket 57. One end of the bushing 74 extends into a gear case 76 where it is secured by split-collar clamp 77 exteriorly of said gear case. One end of the shaft 72 projects beyond the gear case end of the bushing 74 and into said casing where the hub of a beveled gear 78 is pinned to said shaft at 79; see Figs. 2 and 3. Gear 78 meshes with a companion gear 81 which is keyed to the slicing knife drive shaft 25 at 82.

Shaft 25 extends through a tubular housing 83, Fig. 3, wherein its right end portion is supported by a bearing unit 84. A reduced diameter left end portion of said shaft 25, Fig. 3, is rotatively carried by the inner race of a ball bearing unit 85 of which the outer race is carried within the bore of a threaded cartridge 86 of which the threads mesh with a threaded bore 87 in an end wall of the gear case 76. Said inner race of the ball bearing unit 85 is clamped on the reduced end portion 88 of the shaft 25 between a nut 89 and a shoulder 91 of such shaft so that axial movement of the cartridge and hence of said bearing unit 85 causes endwise adjustment of the shaft 25. This endwise adjustment of the slicing knife drive shaft regulates the position of the upper edge portion of said knife relatively to the chamber opening 15 to control the thickness of slices into which the cuttable material is cut, and such endwise adjustment of the shaft is accomplished by rotating the cartridge 86 within the threaded bore 87.

Further adjustment of slice thickness is accomplished by radial adjustment of the hinged chamber wall portion 13, and this adjustment is maintained by tightening a nut 92 upon a threaded shank 93 carried by an arm 94.

In Fig. 1 an opening 95 is shown in the rotor end wall 18 and through which sliceable material is introduceable into the rotor chamber. That portion of the table top 43 exposed in Fig. 1 supports a hopper 96 shown in Fig. 2. This hopper has an upstanding perimetric wall 97 and a bottom wall 98 which slopes downwardly toward the rotor end wall opening 95 for discharging through such opening into the rotor chamber. An opening (not shown) in the perimetric wall 97 registers with the rotor wall opening 95, and a spout (not shown) is preferably provided for projecting from the hopper bottom wall 98 through the opening 95 a short distance.

A swingable frame 101 supports the slitting and dicing instrumentalities. This frame comprises a pair of vertically spaced tubes 102 and 103 which extend between and interconnect frame end pieces 104 and 105. The frame end piece 104 has a bore 106 for the tube 102 and a bore 107 for the tube 103. A slit 108 interconnects these bores 106 and 107 as an expedient for clamping the circular walls of the bores tightly onto the tubes 102 and 103 when a set screw 109 passing through a bridge 111 at one side of the slit is tightened for drawing this bridge toward the main body of the end piece. A similar construction is provided in the end piece 105, the slit 108' corresponding to the slit 109 being shown in Fig. 1. Pivotal support for the frame 101 is provided by hinge members 112 and 113 which are pivotally connected by a vertical hinge pin 114. Hinge member 113 has a flanged footing 115 connected by cap screws 116 with an end of the bracket 57. Hinge member 112 has a pair of vertically spaced bores 117 which respectively receive and tightly grip end portions of the frame tubes 102 and 103.

When the machine is set up for operation, the frame 101 will be secured for supporting the parts thereon in the position illustrated in Figs. 2 and 3. Such securement of the pivoted frame is accomplished by gear housing complements 118 and 119, Fig. 2, having vertical opposed faces 121 and 122 held together by thumb screws 123 which pass through apertured bosses 124 in the housing complement 119 and screw into threaded apertures in projections 125 and 126 of the gear housing complement 118. When the frame 101 is clamped in the operative position, a gear 127 which is coaxial with and drives the bank of slitting knives 32, meshes with and is driven by a gear 128 which is mounted upon an end of the shaft 53 and constrained for rotation therewith. Gear 127 is constrained for rotation with and drives a shaft 129 which extends between the two frame members 104 and 105 and has opposite end portions respectively journaled therein. This shaft 129 carries the disk knives 32 which have central openings through which said shaft extends and which are axially separated by annular members 131; see Fig. 4. These disk knives 32 and the spacing members 131 therebetween are constrained for rotation with the shaft 29. The end of the shaft 129 exposed in Fig. 1 mounts a gear 131 which is constrained for rotation therewith and this gear is meshed with a pinion 132 which is mounted on and drives a shaft 133 which extends between and is journaled in the swingable frame and members 104 and 105. The carrier 36 for the dicing knives 35 is mounted on the shaft 133 with which it is constrained for rotation.

Driving means for the feed roller structure 31 comprises a chain 134, Figs. 2 and 5, which is trained over a sprocket 135 on the gear driven shaft 129 and a sprocket 136 which is constrained for rotation with a shaft 137, Figs. 3 and 4 which extends between and is journaled in the frame end plates 104 and 105. A series of axially ribbed annuluses 138, Figs. 3 and 4, are constrained for rotation with the shaft 137 and are held in axially spaced relation by annular spacer members 139 disposed therebetween. The axial ribs on the circular outer peripheries of the annulus members 138 are designated 141 and the ribs on these members are in axial alignment. The members 138 thus assembled on the shaft 137 with the spacing members 139 form a circumferentially ribbed compressing roller or roller structure whereon each of the circumferential ribs respectively formed by the members 138 are the axially extending ribs 141. The chain 134 drive connecting the compressing roller structure and the bank of slitting knives, cause these assemblies to rotate in the same direction illustrated by the arrows in Fig. 3.

The end plates 104 and 105 of the hinged carriage 101 in addition to being connected by the tubular members 106 and 107 are connected by and support the stripper bar 39. Further reenforcement of the frame is provided by the cutting block 28 which is secured between the two end plates 104 and 105 by means of bolts 142 which are visible in Fig. 1. The cutting block 28 constitutes a species of slice orientating and guiding structure having a guide surface of elongated laterally-spaced portions 143 (rib-like) for contact with the broad flat faces of material slices to support and guide them. The elongated surface portions, as shown in Figs. 3 and 4, are arranged in substantial parallelism with a median line extending between the upper receiving edge and the lower discharge edge of said guide face.

Further reenforcement for the swingable frame 101 is provided by a rod 144 extending between and having opposite end portions clamped in receptive bosses 145 and 146 therefor upon said end plates. This rod 144 provides support for the deflecting plate structure 26 which is secured to the rod by cap screws 146.

The strip cutting and dicing instrumentalities are so disposed with respect to the rotor chamber 11 that the force of gravity augments the down force imparted to the slices as they are discharged through the chamber wall opening 15. These discharged slices are precipitated downwardly through the throat formed between the deflecting plate 26 and the upper portion of the disk knife 21 and are thus directed into the bight between the cutting block guide face and the periphery of the cylindrical compressing and feeding roller structure 31. Since this roller structure is caused to rotate in the direction of the arrow thereon in Fig. 3, the downwardly moving sliced material is caused to continue its downward sliding movement along the cutting block face 27. The circumferentially spaced ribs 141 on the axially spaced circumferential ribs 138 of the feeding and compressing roller structure are adapted to bite into the surface of the sliced material for increasing the traction of the roller structure therewith and thereby augmenting the positiveness with which the material is caused to advance downwardly. By providing the ribs 143 on the surface of the cutting block in close relation to the cylindrical periphery of the compressing roller structure, the tendency for the sliced material to adhere to such surface of the cutting block is diminished, thereby adapting the machine to operate upon substances such as meat having greater inherent tendencies to adhere to surfaces contacted thereby than do fruit and vegetable articles from which juices having lubricating characteristics are exuded.

The flat slices of the material thus fed downwardly between the bank of knives 32 and the cutting block 28 are cut into strips as these knives, rotated in the direction indicated by the arrow thereon in Fig. 3, tend to progress the material downwardly. Strips thus formed of the sliced material are deflected from between the axially spaced disk knives 32 by the stripping fingers 41 and directed between the opposed cutting block face and the faces 42 upon said stripping fingers into the path of the revolving dicing knives 35 which cut the strips of material into pieces of desired length, usually of a length to form cubes.

By loosening the thumb screws 123 and removing the same from the threaded apertures therefor in the bosses 125 and 126, Fig. 1, the gear housing component 119 may be separated from the component 118 incident to the swinging of the frame 101 and the instrumentalities thereon into a position as they are illustrated in Fig. 1. This outward swinging of the frame 101 about the axis of the vertical hinge pin 114, Fig. 2, demeshes the gears 127 and 128 as illustrated in Fig. 1. While the frame 101 is swung outwardly in this manner the parts thereon are made more accessible for cleaning and servicing as are the parts from which they are thus separated on the table top.

Having thus described a preferred illustrative embodiment of the invention with the view of clearly and concisely illustrating the same without incurring limitations respecting structural departures which will become apparent to those skilled in the art and embraced within the scope of the invention,

We claim:

1. In a sectionalizing cutting machine, a slice orientating and guiding structure having a guide surface of elongated laterally-spaced portions for contact with broad faces of material slices to support and guide them, a circumferentially ribbed compressing roller arranged transversely of said guide surfaces and contiguously thereto to cooperate therewith in forming a material receiving throat having an inlet side and an outlet side, slicing mechanism for slicing cuttable material and having a discharge section from which slices of such material are discharged in succession into contact with said guide surface contiguously to the inlet side of said throat, means for rotating the roller to cooperate with the guide surface in compressing said slices and advancing them through the throat, a bank of circular axially-spaced knives rotatable about an axis in parallelism with the compressing roller at the outlet side of said throat, edge portions of said knives being disposed in cooperative cutting relation with a portion of the guide surface to cut the slices into strips as such slices issue from the outlet side of the throat, means for rotating the knives to expedite such cutting of the slices into strips, and the knives being meshed with the compressing roller ribs to minimize spacing of the knives from the throat.

2. The combination set forth in claim 1, wherein the knives have edge portions meshed with laterally-spaced portions of the guide surface to facilitate cutting of the slices into strips.

WILLIAM E. URSCHEL.
JOE R. URSCHEL.
GERALD W. URSCHEL.

REFERENCES CITED

The following references are of record in the file of this patent:

UNITED STATES PATENTS

| Number | Name | Date |
|---|---|---|
| 1,271,868 | Dunn | July 9, 1918 |
| 2,126,361 | Urschel et al. | Aug. 9, 1938 |
| 2,242,557 | Urschel et al. | May 20, 1941 |
| 2,349,212 | Urschel et al. | May 16, 1944 |
| 2,465,670 | Urschel et al. | Mar. 29, 1949 |